United States Patent

[11] 3,628,748

[72] Inventors Donald O. Easterly;
Daniel J. Stark, both of Rochester, N.Y.
[21] Appl. No. 22,181
[22] Filed Mar. 24, 1970
[45] Patented Dec. 21, 1971
[73] Assignee Eastman Kodak Company
Rochester, N.Y.

[54] FILM-FEEDING MECHANISM
6 Claims, 4 Drawing Figs.
[52] U.S. Cl. .................................................. 242/192,
242/75.2
[51] Int. Cl. ....................................................G11b 15/32,
G11b 15/66
[50] Field of Search........................................... 242/192,
195, 186, 188, 201, 202, 206, 208, 209, 210, 207,
197, 198, 71.1, 204, 75.2; 352/157, 158, 72, 78;
226/91, 92

[56] References Cited
UNITED STATES PATENTS
3,550,879 12/1970 Bundschoh et al. .......... 242/192
3,550,881 12/1970 Roman ........................ 242/192

*Primary Examiner*—George F. Mautz
*Attorneys*—Robert W. Hampton and G. Herman Childress ABSTRACT: A film-feeding mechanism for a self-threading cartridge loading motion picture projector or the like comprises a stripping finger engageable with a roll of film in a cartridge for deflecting the film from the cartridge for travel along an edge of the finger. A drivebelt is engageable with the roll adjacent to the finger for driving the roll in an unwinding direction during film-stripping operations. Means are provided for urging the film stripped from the roll into positive engagement with the finger along its guide surface to prevent twisting of the film as it is fed from the roll and thereby avoid film threading failures that might otherwise occur by an automatic film threading device of the projector being unable to accept twisted film delivered to such device by the film-feeding mechanism.

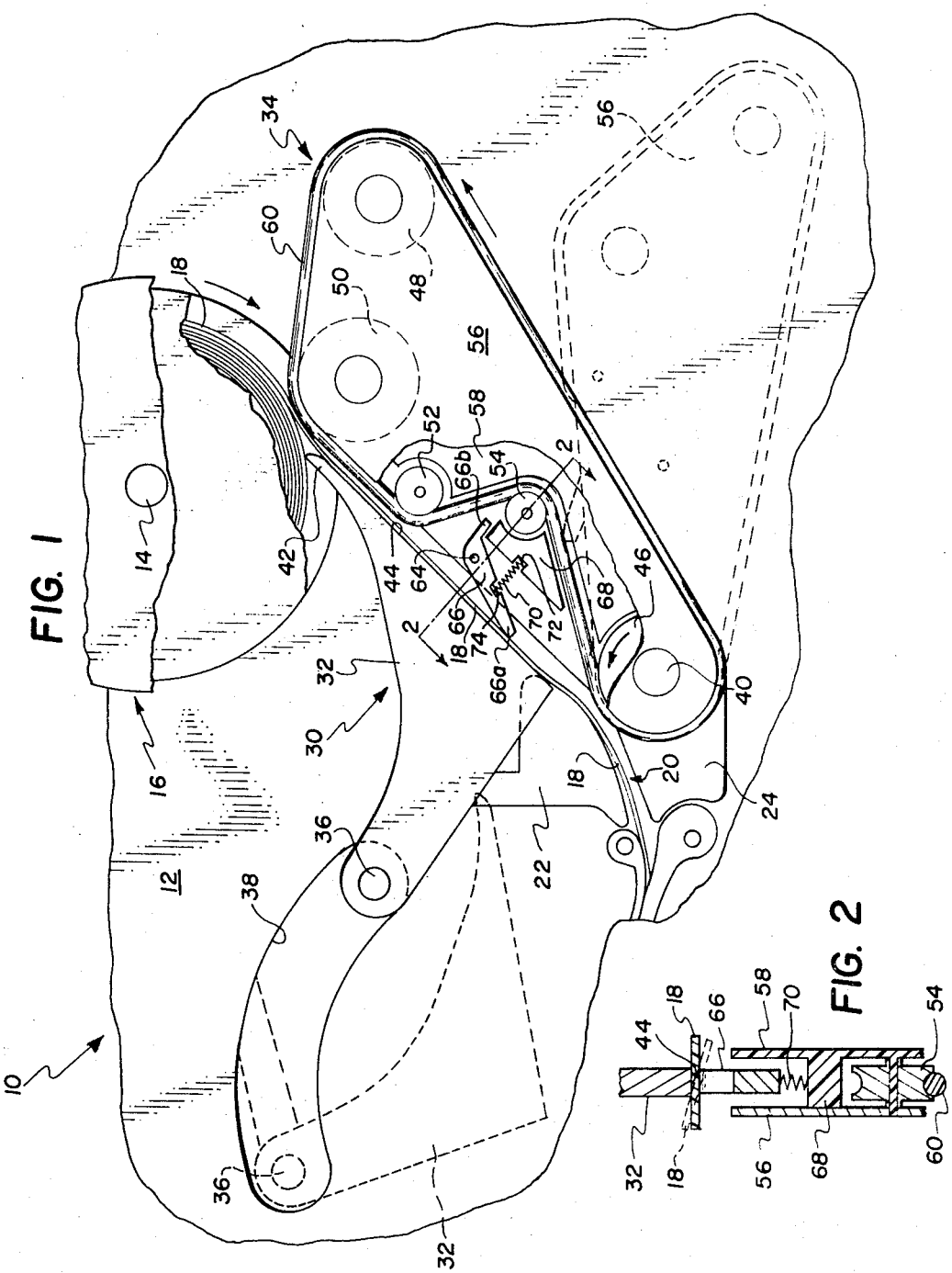

DONALD O. EASTERLY
DANIEL J. STARK
INVENTORS

FILM-FEEDING MECHANISM

CROSS-REFERENCES TO RELATED APPLICATIONS

Reference is made to commonly assigned copending U.S. Pat. application Ser. No. 643,503, entitled "Cartridge for Reel of Strip Material," filed in the names of John J. Bundschuh and Kenneth W. Thomson, now U.S. Pat. No. 3,536,276; U.S. application Ser. No. 685,616, entitled "Chinematographic Projectors or the Like and Cartridges For Use Therewith," filed in the names of John J. Bundschuh and Robert J. Roman, now U.S. Pat. No. 3,552,683; and Ser. No. 731,377, entitled "Film Stripping Mechanism," filed in the name of Allan M. Palmer, now U.S. Pat. No. 3,550,880.

BACKGROUND OF THE INVENTION

1. Field of the Invention

This invention relates to automatic or self-threading, cartridge-loading motion picture projectors and, more specifically, to a film-feeding mechanism for removing film from a roll of film contained in a cartridge attached to a cartridge-loading motion picture projector, and for delivering such film to automatic film-threading devices of the projector.

2. Description of the Prior Art

The related patent applications referred to before and U.S. Pat. No. 3,468,498 to Bunting disclose film-feeding mechanisms comprising a stripping finger that is moved from a position outside a cartridge on a cartridge projector through an opening in the cartridge and into engagement with a roll of film in such cartridge to deflect the leading end of the film from the roll and to guide the film out of the cartridge along an edge of the finger. They also disclose a drivebelt mounted on a plurality of rollers or pulleys and moveable from a position outside the cartridge to a second position wherein part of the belt is inside the cartridge and engageable with the film roll so that the belt can drive the roll in an unwinding direction for delivering the leading end of the film to the stripping finger. When the finger and belt both are in engagement with the film roll, one reach of the belt between two rollers is located adjacent to the guide edge of the stripping finger to form a long, narrow film channel that is, for example, approximately 0.080 inch wide. While the dimensions of motion picture films may vary considerably, two common types now available (i.e., Kodachrome II and Eastman Color Print) have thicknesses that range from about 0.0055 inch to about 0.0070 inch film from the roll is guided through this channel to automatic threading devices of the projector. It has been found that the width of this channel permits film that is twisted or skewed to pass through the channel in its twisted condition, and such twisted film can cause failures in threading of the film through the projector due to the inability of automatic threading devices to accept twisted film delivered to such devices from the film-feeding mechanism.

SUMMARY OF THE INVENTION

Accordingly, it is an object of this invention to improve reliability of overall threading of web material from a roll of such material in a cartridge to a web takeup device. Another object of this invention is to avoid film-threading failures resulting from delivery of film to an automatic threading device while the film is twisted or not properly oriented for reception by such device. A further object of the invention is to eliminate the need to maintain substantially exact parallelism between a reach of a belt and an edge of a finger in a film-feeding device.

In accordance with one embodiment of the present invention an improved feeding mechanism for film or other web material is provided which reduces substantially to zero the width of the channel for film at one point between an edge of the stripping finger and a portion of the drive means so that film delivered from such channel is properly oriented (i.e., not twisted) for reception by an automatic threading device. In accordance with preferred embodiments of the invention, a member is biased directly against the film, or a member is biased against a reach of the drive means for urging the drive means against the film.

The invention, and its objects and advantages, will become more apparent in the detailed description of the preferred embodiments presented below.

BRIEF DESCRIPTION OF THE DRAWING

In the detailed description of the preferred embodiments of the invention presented below, reference is made to the accompanying drawing, in which:

FIG. 1 is a fragmentary view of a portion of a projector showing a film-feeding mechanism in accordance with one embodiment of the invention, and illustrating engaged and retracted positions of such mechanism;

FIG. 2 is a fragmentary cross section taken along line 2—2 of FIG. 1; and

DESCRIPTION OF THE PREFERRED EMBODIMENTS

Figure 3:
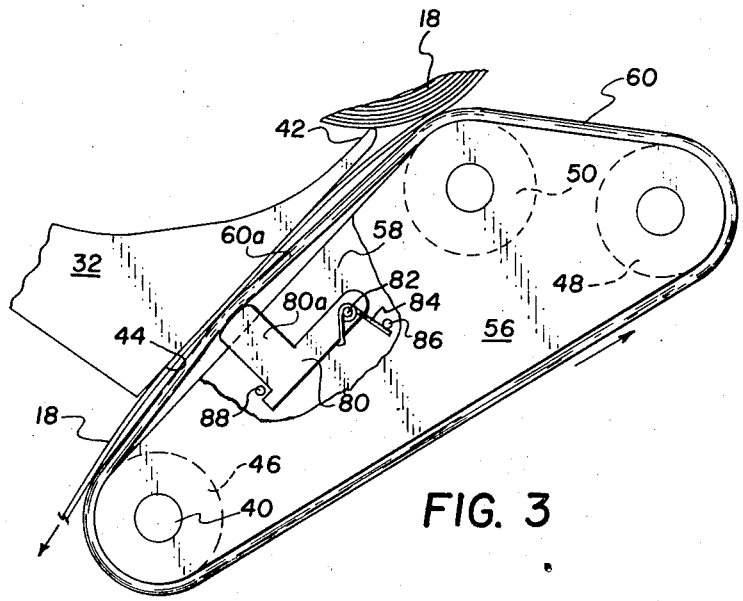
FIGS. 3 and 4 are views showing embodiments of film-feeding mechanisms of this invention.

Because photographic apparatus is well known, the present description will be directed in particular to elements forming part of, or cooperating more directly with, the present invention, photographic elements not specifically shown or described herein being understood to be selectable from those known in the art.

Referring now to FIGS. 1 and 2, a portion of a cartridge-loading motion picture projector is illustrated generally at 10 and is shown to comprise a plate 12 having cartridge-orienting means (not shown) that receives and locates on the projector a cartridge 16 containing a roll of motion picture film or other suitable web material designated 18. The film can be wound on a reel 19 that is supported within the cartridge by a spindle 14. Preferably, the projector is of the automatic threading type so that the leading end of film 18 need only be delivered to a slot 20 between a pair of guide members 22 and 24 on plate 12 in order for the film to be threaded from the supply roll to a suitable film takeup device (not shown). For a description of such a projector, reference is made to the before-mentioned U.S. Pat. No. 3,552,683 to Bundschuh et al. and to U.S. Pat. No. 3,468,498 to Bunting.

A film-feeding mechanism of this invention is generally designated 30 and comprises a film-stripping finger or member 32 and drive means 34. Finger 32 is shown mounted on a shaft 36 that is movable through a guide slot 38 in plate 12 so that the finger can be moved between the positions shown in solid and dashed lines in FIG. 1 by movement of the shaft 36. Also, the drive means 34 is mounted for pivotal movement about a drive shaft 40 from the retracted position (shown in dashed lines) wherein the drive means is completely outside the film cartridge 16 to the engaged position shown in solid lines wherein a portion of the drive means is inside the cartridge and in engagement with the film roll 18 for driving such roll in an unwinding direction as indicated by the arrows in FIG. 1. MOvement of the stripping finger and drive means between their retracted and engaged positions may be effected in the manner described in the before-mentioned U.S. Pat. No. 3,552,683, for example.

Stripper finger 32 comprises an end portion 42 that is adapted to be brought into engagement with the outer convolution of the roll of film 18 for deflecting the leading end of such film roll when the roll is driven in an unwinding direction by drive means 34. Finger 32 also has an elongate, substantially straight side edge 44 extending from said tip 42 toward slot 20 when the finger is in its engaged position so that the leading end of the film deflected from the roll can be guided along edge 44 toward the slot 20. Guide edge 44 is substantially parallel to and closely adjacent to a portion of drive means 34 when the mechanism is in its engaged position so that the film is confined within a narrow space between these portions of the film-feeding mechanism. The substantially parallel relation between the parts can be maintained for a wide range of film roll diameters in the manner described in the before-mentioned U.S. Pat. No. 3,550,880.

Drive means 34 comprises a drive pulley or roller 46 secured to shaft 40 and a plurality of idler rollers or pulleys designated 48, 50, 52 and 54 that are mounted for rotation between spaced sideplates 56 and 58. An endless drivebelt 60 is trained around the drive pulley and idler pulleys in the manner shown so that the portion of the belt at or adjacent roller 50 is engageable with the roll of film for driving the roll in an unwinding direction. The drivebelt is driven from pulley 46 through drive shaft 40. The reach of the belt 60 extending between rollers 48 and 50 serves to urge the leading end of the film away from the outer periphery of the cartridge and toward the tip end portion 42 of finger 32 in the event such leading end has clocksprung away from the main portion of the roll, such being described in more detail in the before-mentioned U.S. Pat. No. 3,536,276.

A pivot 64 projects from sideplate 58 and mounts a finger or lever 66. An end portion 66a of the lever on one side of pivot 64 can project beyond the edges of plates 56 and 58 and is engageable with a portion of the web 18 for urging the web positively (but lightly) against the edge 44 of the stripping finger 32. The other end portion 66b of the lever at the other side of pivot 64 is engageable with an abutment 68 on plate 58 that forms a stop for limiting pivotal movement of finger end portion 66a in a clockwise direction as viewed in FIG. 1. A light compression spring 70 has its end portions positioned in openings 72 and 74 in abutment 68 and lever 66, respectively, so that the spring reacts from the abutment against the lever 66 for urging end portion 66a in a clockwise direction and against the film. The light biasing force applied by spring 70 does not significantly impede passage of the film between the finger 66 and member 32 but it does positively urge the film against edge 44 of member 32 so that if the film is twisted from its desired orientation (as shown in phantom in FIG. 2) the light pressure exerted by finger 66 reorients the film so hat it is located correctly (as shown in solid lines in FIG. 2) for delivery to slot 20. As noted earlier, in the event the film is twisted or not properly oriented, it may not be received by the automatic threading device of the projector due to the inability of such devices to accept twisted film. Thus lever 66 assures acceptance of film by the automatic threading mechanisms. The upper edge of lever 66 is inclined away from the film roll, i.e., generally in the direction of film travel, to minimize interference with travel of the film.

FIG. 3 illustrates another embodiment of the invention wherein a lever or finger 80 is mounted for movement about a pivot 82 carried by sideplate 58. A coil spring 84 has a central portion that is coiled about pivot 82 and and end portions that engage the underside of lever 80 and an abutment 86 for biasing the lever in a clockwise direction about pivot 82. Such clockwise movement of the lever is limited by a stop 88 projecting from plate 58 and engageable by part of the lever. In this embodiment of the invention, belt guide rollers 52 and 54 have been omitted and the belt is trained about only the three rollers 46, 48 and 50 located at the corners of plates 56 and 58 so that the belt travels in a generally triangular path. Thus one reach 60a of the belt between pulleys 46 and 50 is adjacent edge 44 of member 32 from the film roll in the cartridge toward the threading slot 20. An end portion 80a of lever 80 is biased by spring 84 against the belt reach 60a for urging such portion of the belt against the portion of film 18 between that reach and edge 44, thereby to narrow the gap or space between the belt and member 32 at a point between the ends of edge 44. The light but positive force or pressure exerted by lever 80 properly orients the film between the belt edge 60a and edge 44 so that twisting of the film is avoided and proper delivery of the film to automatic threading devices of the projector is assured. In other respects, the embodiment illustrated in FIG. 3 is the same as that described hereinbefore in connection with FIGS. 1 and 2 and, accordingly, the same reference numerals have been used to indicate the same or similar parts.

Figure 4:
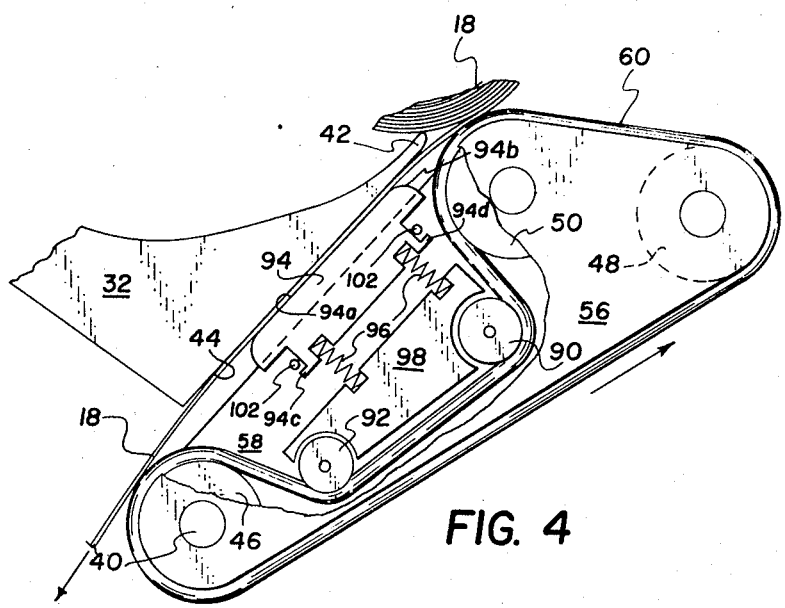

FIG. 4 illustrates a still further embodiment of the invention wherein the belt 60 is trained about pulleys 46, 48 and 50 in the manner previously described, and also about two guide pulleys 90 and 92 located in spaced relation from the upper edge of plates 56 and 58 so that the portion of belt 60 extending between pulleys 90 and 92 is spaced a substantial distance from that edge of the plates. A shoe 94 positioned between plates 58 and 56 has an elongate surface portion 94a that is directly engageable with the film 18 along the film path between the drive means and the edge 44 of member 32. Preferably the end of surface portion 94a nearest the roll of film 18 is rounded as shown at 94b so that film is smoothly guided in the space between the shoe in member 92. A pair of springs 96 react from the bottom of spring mounting recesses in an abutment 98 against the shoe for biasing the shoe into engagement with the film, thereby to hold the film firmly against edge 44 and prevent twisting of the film in much the same manner as previously described in connection with FIGS. 1–3. Movement of shoe 94 away from abutment 98 is limited by stops 100 and 102 that project from plate 58 and are engageable by projecting flanges 94c and 94d on the shoe. In other respects the film-feeding mechanism illustrated in FIG. 4 is substantially the same as that described hereinbefore in connection with the embodiment shown in FIGS. 1–3. Accordingly, the same reference numerals have been used to designate the same or similar parts.

The invention has been described in detail with particular reference to preferred embodiments thereof, but it will be understood that variations and modifications can be effected within the spirit and scope of the invention.

We claim:

1. In a film-feeding mechanism for removing a leading end of a web material from a roll of such material, such mechanism comprising a film-stripping member engageable with the roll for separating the leading end of the web from the roll, drive means for rotating the roll, and web guide means including a portion of said member defining a web path for guiding the web away from the roll, the improvement comprising:
    means carried by said drive means for engaging the web as it passes along the web path adjacent the member; and
    means coupled to said web-engaging means for biasing said web-engaging means toward the web path and against the web when the web is in said path, thereby urging the web against said portion of said member.

2. In a film feeding mechanism as set forth in claim 1 wherein said drive means comprises a support member, said web-engaging means includes a lever pivotally mounted on said support member, and said drive means further comprises a stop carried by said support member for limiting pivotal movement of said lever with respect to said support member.

3. In a film-feeding mechanism as set forth in claim 2 wherein said drive means comprises an endless belt trained around a plurality of rotatable members, and said lever has a portion directly engageable with the web for urging the web against the portion of said member defining part of said web guide means.

4. In a film-feeding mechanism as set forth in claim 2 wherein said drive means comprises an endless belt trained about a plurality of rotatable members and having one reach defining a portion of said web guide means whereby the web is adapted to pass between such one reach and said portion of said member forming part of said web guide means, and said lever has a portion engageable with said reach to urge said reach toward said web path and against the web when the web is in said web path whereby the web in said path is held firmly against said member to properly orient the web.

5. In a film-feeding mechanism as set forth in claim 1 wherein said web engaging means comprises a shoe having a portion directly engageable with the web when the web is in said web path for urging the web against said film-stripping member, and said mechanism further comprises means for limiting movement of said shoe toward said web path.

6. In a film-feeding mechanism as set forth in claim 5 wherein said drive means comprises an endless belt trained around a plurality of rotatable members, and said shoe is positionable between a portion of said belt and said film-stripping member.

* * * * *